United States Patent [19]
Jannson et al.

[11] Patent Number: 5,631,754
[45] Date of Patent: May 20, 1997

[54] HOLOGRAPHIC HIGH CONTRAST VIEWING SCREEN EMBEDDED IN A LIQUID CRYSTAL DISPLAY

[75] Inventors: Tomasz P. Jannson, Torrance; Tin M. Aye, Mission Viejo; Jeremy Lerner, Culver City, all of Calif.

[73] Assignee: Physical Optics Corporation, Torrance, Calif.

[21] Appl. No.: 546,026

[22] Filed: Oct. 20, 1995

[51] Int. Cl.⁶ .................. G02F 1/1335; G02F 1/1337; G02B 5/32

[52] U.S. Cl. .................. 349/64; 359/15; 359/599; 349/130

[58] Field of Search .................. 359/69, 75, 599, 359/15

[56] References Cited

U.S. PATENT DOCUMENTS

| | | | |
|---|---|---|---|
| 4,277,144 | 7/1981 | Saurer et al. | 359/69 |
| 5,139,340 | 8/1992 | Okumura | 359/69 |
| 5,317,435 | 5/1994 | Kasazumi et al. | 359/69 |
| 5,418,631 | 5/1995 | Tedesco | 359/15 |
| 5,471,327 | 11/1995 | Tedesco | 359/15 |
| 5,528,402 | 6/1996 | Parker | 359/87 |

FOREIGN PATENT DOCUMENTS

| | | | |
|---|---|---|---|
| 609816A2 | 8/1994 | European Pat. Off. | 359/69 |
| 263-362 | 12/1988 | Germany | 359/15 |
| 5-333334 | 12/1993 | Japan | 359/69 |
| 84/00615 | 2/1984 | WIPO | 359/15 |

*Primary Examiner*—William L. Sikes
*Assistant Examiner*—Tiep H. Nguyen
*Attorney, Agent, or Firm*—Nilles & Nilles, S.C.

[57] ABSTRACT

Systems and methods for shaping light from a liquid crystal display are described. A holographic high contrast viewing screen embedded in a liquid crystal display includes a first substrate; a first electrode connected to said first substrate; a light shaping holographic surface relief diffuser connected to said first electrode, said light shaping holographic surface relief diffuser having a first orientation and a first refractive index; a liquid crystal adjacent said light shaping holographic surface relief diffuser, the liquid crystal having a second refractive index that is substantially equal to the first refractive index, in the absence of a driving voltage applied to the first electrode and the second electrode; an alignment layer adjacent said liquid crystal, said alignment layer having a second orientation that is substantially orthogonal to said first orientation; a second electrode connected to said alignment layer; and a second substrate connected to said second electrode. The second refractive index varies as a function of the driving voltage, which is applied between the first electrode and the second electrode. The systems and methods provide advantages in that the field of view, including the horizontal and vertical extent, can be determined, in advance by the manufacturer.

18 Claims, 4 Drawing Sheets

HOLOGRAPHIC HIGH CONTRAST VIEWING SCREEN EMBEDDED IN A LIQUID CRYSTAL DISPLAY

BACKGROUND OF THE INVENTION

1. Field of the Invention

The present invention relates in general to the field of viewing screens. More particularly, the present invention relates to holographic high contrast viewing screens. Specifically, a preferred embodiment of the present invention relates to a liquid crystal display (LCD) wherein a holographically produced structural feature is embedded within the liquid crystal cell so as to provide a holographic high contrast viewing screen. The present invention thus relates to a holographic high contrast viewing screen of the type that can be characterized as embedded in a liquid crystal display.

2. Discussion of the Related Art

Liquid crystal displays are well-known to those skilled in the art. For example, such displays are described in E. Kaneko, Liquid Crystal TV Display, Principles and Applications of Liquid Crystal Display, D. Reidel Pub. Co., Boston, (1987), the entire disclosure of which is hereby expressly incorporated by reference into the present application for the purposes of indicating the background of the present invention and illustrating the state of the art.

Twisted nematic liquid crystals of the type hereunder consideration, sometimes called nematics, are also well-known to those skilled in the art. Conventional nematic materials typically have structures that can be represented by:

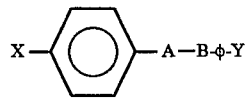

where X, Y is Cyano-CN, Alkyl-$CH_3(CH_2)_n$ and/or Alkioxy-$CH_3(CH_2)_nO$; A—B is Biphenyl (–) or Ester-COO—; and $\phi$ is phenyl, cyclohexyl or biphenyl. Such compounds are readily commercially available from commercial vendors such as Merck and BDH under the designations ZLI1646, ZLI2452, ZLI1167 and E7, E8, . . . E44, respectively. Specific examples of base nematics with chiral additives include:

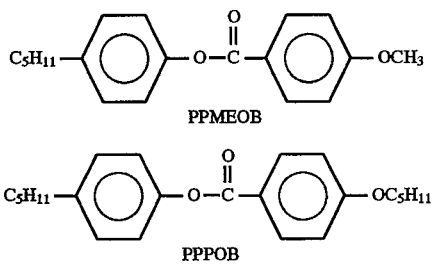

As is well-known to those skilled in the art, the light that passes through a liquid crystal based flat panel display is typically generated by fluorescent lamps located either at the edges, or immediately behind, a backlight. These configurations are commonly found in lap-top computer screens, as well as displays in aircraft cockpits and various scientific equipment.

As is also well-known to those skilled in the art, if the light that passes through a liquid crystal display is distributed everywhere, then the display will appear less bright than if the display sends its light only to one or, perhaps, two viewers of choice. Thus, a previously recognized problem has been that, if the output from a liquid crystal display is not shaped into a viewing area, then the display will appear relatively dark.

However, the light passing through a liquid crystal based flat panel display is extremely difficult to direct towards specific viewers. Therefore, the brightness of such displays is often compromised.

Thus, what is needed is a way of shaping the light from a liquid crystal based flat panel display. Further, what is also needed is a way of shaping the light that is optically optimized for the optical characteristics of a particular liquid crystal display. Heretofore these requirements have not been fully met without incurring various disadvantages.

The disclosures of all the below-referenced prior United States patents, in their entireties are hereby expressly incorporated by reference into the present application for purposes including, but not limited to, indicating the background of the present invention and illustrating the state of the art. U.S. Pat. No. 4,309,093 discloses a method of replicating a diffusing plate. U.S. Pat. No. 4,336,978 discloses a method for optically making a diffusion plate. U.S. Pat. No. 5,365,354, discloses method of making a GRIN type diffuser based on volume holographic material.

SUMMARY AND OBJECTS OF THE INVENTION

By way of summary, the present invention relates to a liquid crystal cell wherein a light shaping holographic surface relief diffuser can be in direct contact with a twisted nematic liquid crystal whose refractive index matches the refractive index of the light shaping holographic surface relief diffuser. An effect of the present invention is that the surface relief holographic diffuser can shape the output from such a liquid crystal cell when an electric field is applied to the electrodes of the cell so as to alter the refractive index of the twisted nematic liquid crystal.

An object of the invention is to provide a liquid crystal display that permits the field of view, including the horizontal and vertical extent, to be determined, in advance by the manufacturer. Another object of the invention is to provide a liquid crystal display wherein the brightness of the display can be enhanced because light can be preferentially sent to a known volume in space where a viewer's eye will tend to be located. Another object of the invention is to provide a liquid crystal display wherein resolution and contrast is very high. Yet another object of the invention is to provide a liquid crystal cell apparatus that is ruggedized and reliable, thereby decreasing down time and operating costs. Still another object of the invention is to provide a liquid crystal cell apparatus that has one or more of the characteristics discussed above but which is relatively simple to manufacture and assemble using a minimum of equipment.

In accordance with a first aspect of the invention, these objects are achieved by a holographic high contrast viewing screen embedded in a liquid crystal display comprising: a first substrate; a first electrode connected to the first substrate; a light shaping holographic surface relief diffuser connected to the first electrode, the light shaping holographic surface relief diffuser having a first orientation and a first refractive index; a liquid crystal adjacent the light shaping holographic surface relief diffuser, the liquid crystal having a second refractive index that is substantially equal to the first refractive index, in the absence of a driving voltage; an alignment layer adjacent the liquid crystal, the alignment layer having a second orientation that is substantially orthogonal to the first orientation; a second electrode connected to the alignment layer; and a second substrate connected to the second electrode, wherein the second refractive index varies as a function of the driving voltage, the driving voltage being applied between the first electrode and the second electrode. In one embodiment, the light shaping holographic surface relief diffuser defines a first plane and the alignment layer defines a second plane that is substantially parallel to the first plane.

Another object of the invention is to provide a method that can be used to control the diffusion characteristics of a liquid crystal cell apparatus by varying the voltage to the liquid crystal cell thereby enabling a user-determined mount of light to pass straight through in zero order without diffusion. Yet another object of the invention is to provide a method that is predictable and reproducible, thereby decreasing variance and operating costs. Still another object of the invention is to provide a method that has one or more of the characteristics discussed above but which is which is relatively simple to setup and operate using relatively low skilled workers.

In accordance with a second aspect of the invention, these objects are achieved by providing a method comprising providing a holographic high contrast viewing screen embedded in a liquid crystal display and applying a voltage differential between a first electrode of the screen and a second electrode of the screen. In one embodiment, the applied voltage differential varies periodically as a function of time.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

DESCRIPTION OF PREFERRED EMBODIMENTS

Figure 1A:
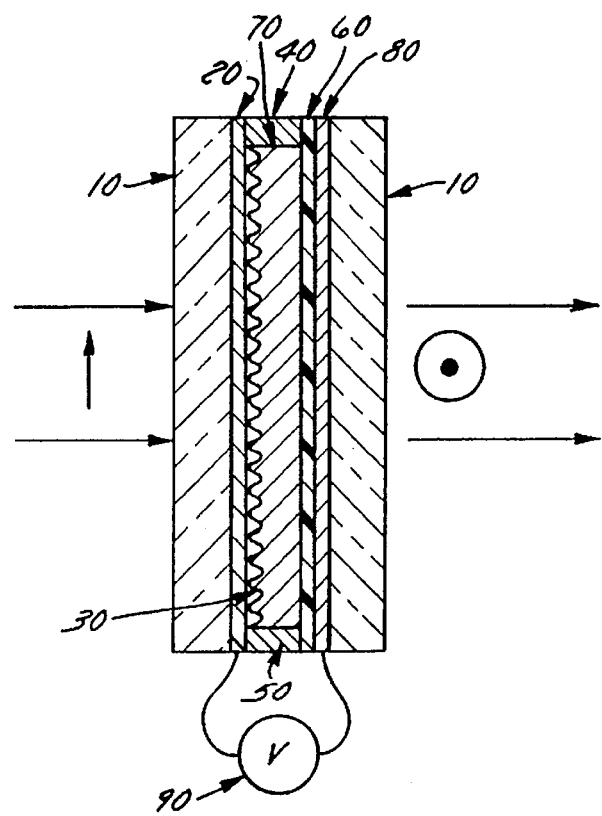
FIG. 1A illustrates a schematic view of a single element of a switchable liquid crystal cell according to the present invention, in an "OFF" state.

The present invention and the various features and advantageous details thereof are explained more fully with reference to the non-limiting embodiments described in detail in the following description.

1. System Overview

The present invention solves the above-discussed brightness problem by utilizing a holographic surface relief diffuser (i.e., a light shaping holographic surface relief diffuser (LSD)) embedded in a liquid crystal display. By placing the surface relief in direct contact with a twisted nematic liquid crystal, the light shaping holographic surface relief diffuser functions as one of the alignment layers.

If the refractive index of the light shaping holographic surface relief diffuser is substantially the same as the refractive index of the liquid crystal when the driving voltage is zero, then light can pass through the liquid crystal display without deviation or diffusion being imposed from the light shaping holographic surface relief diffuser when the when the liquid crystal cells are in the "OFF" state. Thus, the effect of the surface relief structure can be negated.

Conversely, if the driving voltage is nonzero, then the refractive index of the liquid crystal can vary as a function of the applied voltage differential, and light can be diffused by the light shaping holographic surface relief diffuser, when the liquid crystal cells are in an "ON" state. Thus, the surface relief structure can exert an effect on the output of the display.

2. Detailed Description of Preferred Embodiments

Referring to the drawings, it can be seen that when a voltage is applied (the "ON" state) a change in refractive index of the liquid crystal compared to the light shaping holographic surface relief diffuser results in the diffuser being "activated" sending properly polarized light into a predetermined output distribution. This predetermined output distribution can be circular or elliptical, or even rectangular, so as to define various flux cones. Further, the predetermined output distribution can vary continuously, or discontinuously, as a function of the applied driving voltage differential.

For example, 100% diffusion, at maximum voltage, would permit no light whatsoever to pass straight through (in "zero" order) without diffusion. By reducing the voltage a controlled amount of light may be sent undeviated, or diffused, through the display.

Referring to FIG. 1A, a single element of a switchable liquid crystal cell is depicted in an "OFF" state. At the left of FIG. 1, polarized light is incident upon substrate 10. Substrate 10 is preferably glass. First electrode 20 is connected to substrate 10. First electrode 20 is preferably a layer of indium-tin-oxide that is coated on substrate 10. Surface relief diffuser 30 is connected to first electrode 20. Surface relief diffuser 30 can replace one of the two polyvinylalcohol (PVA) or other types of alignment layers typically used in liquid crystal cells. Spacers 40 and 50 separate alignment layer 60 from light shaping holographic surface relief diffuser 30. Alignment layer 60 can be made of polyvinylalcohol. Liquid crystal 70 is located between light shaping holographic surface relief diffuser 30, spacer 40, spacer 50 and alignment layer 60. Liquid crystal 70 can be a twisted nematic liquid crystal, such as, for example, PPMEOB and/or PPPOB. Light shaping holographic surface relief diffuser 30 is orthogonally oriented with regard to alignment layer 60. Therefore, if liquid crystal 70 is a twisted nematic liquid crystal, the polarized light incident upon substrate 10 can be rotated 90 degrees as it passes through liquid crystal 70. Second electrode 80 is connected to alignment layer 60. Another substrate 10, is connected to second electrode 80. A driving voltage 90 is connected to first electrode 20 and second electrode 80. (It should be noted that FIG. 1 is not drawn to scale and the surface relief of the light shaping holographic surface relief diffuser 30 is represented schematically for improved clarity.)

A thin film (approximately 10 micrometers thick) of light shaping holographic surface relief diffuser 30, capable of forming an elliptical output, replaces the first polyvinylalcohol layer used to orient the liquid crystals in a conventional liquid crystal cell. The liquid crystal 70 is deposited between the light shaping holographic surface relief diffuser and a conventional layer of polyvinylalcohol oriented orthogonally to the light shaping holographic surface relief diffuser.

The light shaping holographic surface relief diffuser can be any holographic surface relief diffuser. For example, the volume holographic material of U.S. Pat. No. 5,365,354 can be further processed by, for example, etching or swelling to fabricate a light shaping holographic surface relief diffuser. Further, such a light shaping holographic surface relief diffuser can be disordered in that it need not have a periodic structure.

Figure 1B:
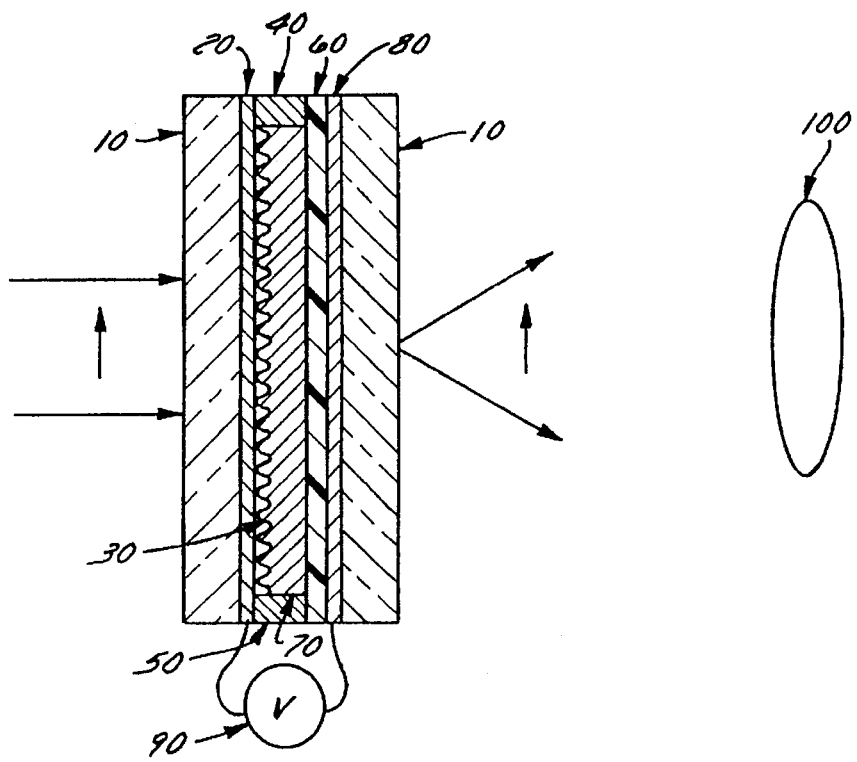
FIG. 1B illustrates a schematic view of the single element shown in FIG. 1A, in an "ON" state.

Referring now to FIG. 1B, in the "ON" state, the light shaping holographic surface relief diffuser distributes light over a predetermined elliptical area. In this state, driving voltage 90 assumes a differential value and causes the refractive index of liquid crystal 70 to change. Therefore, for a properly polarized light, the refractive index of liquid crystal 70 is not equal to the refractive index of light shaping holographic surface relief diffuser 30 in FIG. 1B. Thus, the light shaping holographic surface relief diffuser 30 produces an elliptically shaped diffusion pattern 100. Although the embodiment shown in FIG. 1B produces the elliptically shaped diffusion pattern 100, it is within the level of ordinary skill in the art after having knowledge of the invention disclosed herein to change the surface relief of light shaping holographic surface relief diffuser 30 to obtain a circularly shaped diffusion pattern, or even a rectangularly shaped diffusion pattern.

A user determined voltage anywhere between 0 and 10 volts, as required, can be applied. For example, an alternating current at about 1 KHz with a square wave can be applied.

Figure 1C:
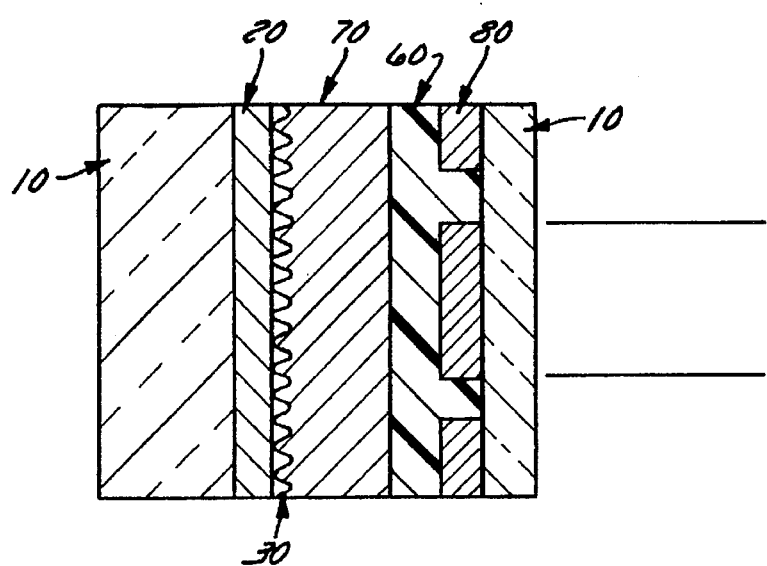
FIG. 1C illustrates a schematic view of a switchable liquid crystal cell geometry according to the present invention.

Referring now to FIG. 1C, an example of a geometry for a liquid crystal cell according to the present invention is depicted. Substrate 10 can be a glass material that is from approximately one millimeter to approximately two millimeters in thickness. First electrode 20 can be an indium-tin-oxide electrode layer that is from approximately 100 angstroms to approximately 3,000 angstroms in thickness. Light shaping holographic surface relief diffuser 30 can be acrylic or ultraviolet curable polymer of from approximately one micron to approximately two microns in thickness. Liquid crystal 70 can be a nematic liquid crystal layer of approximately 10 microns in thickness. Alignment layer 60 can be a polyvinylalcohol alignment layer of approximately 500 angstroms thickness. In FIG. 1C, the second electrode 80 is depicted as a pixelated matrix having a pixel dimension of from approximately 50 microns to approximately 100 microns. In order to provide electrical isolation between the pixels, alignment layer 60 can extend through second electrode 80 so as to fill the gaps between the pixels. Another substrate 10 can be the basis for yet another liquid crystal layer or, alternatively, be the outer extent of the liquid crystal display.

Figure 2A:
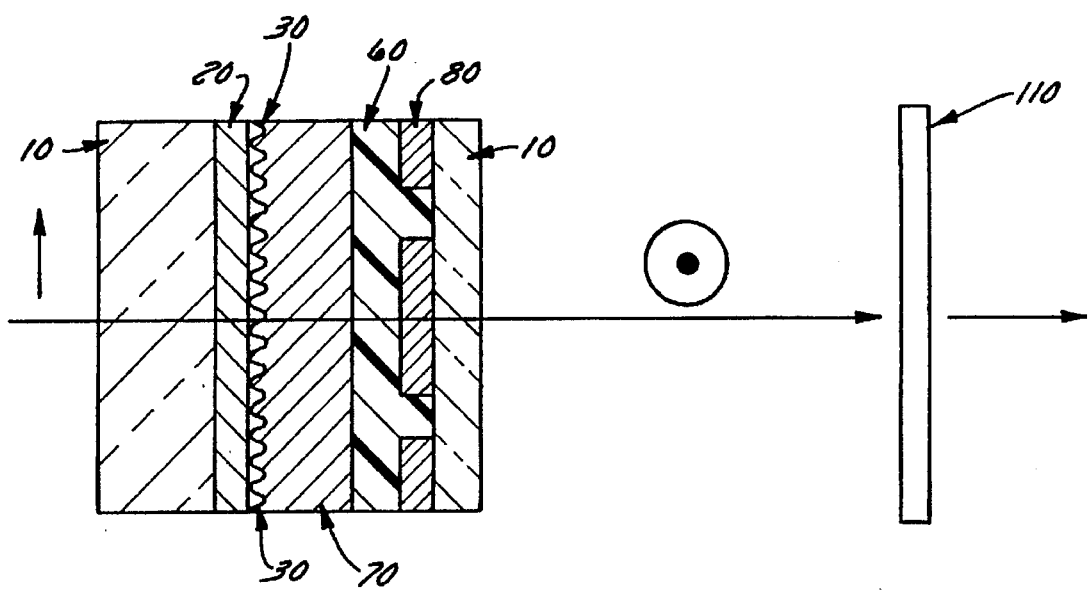
FIG. 2A illustrates a schematic view of a switchable liquid crystal cell according to the present invention, in an "OFF" state.

Referring now to FIG. 2A, a pixelated liquid crystal cell in an "OFF" state is depicted. In this state, the liquid crystal cell is substantially transparent, permitting light to pass through without interruption, or diffusion by the light shaping holographic surface relief diffuser, albeit rotated in the case of the case of a twisted nematic liquid crystal. In this condition, the refractive index of the light shaping holographic surface relief diffuser 30 and the liquid crystal 70 are substantially the same. For example, the refractive index of the light shaping holographic surface relief diffuser 30 and the refractive index of the liquid crystal 70 can be approximately 1.50. Therefore, the effect of the light shaping holographic surface relief diffuser 30 is negated. Further, no light passes beyond polarizer 110 because light from the liquid crystal is rotated orthogonally with regard to the orientation of polarizer 110.

Figure 2B:
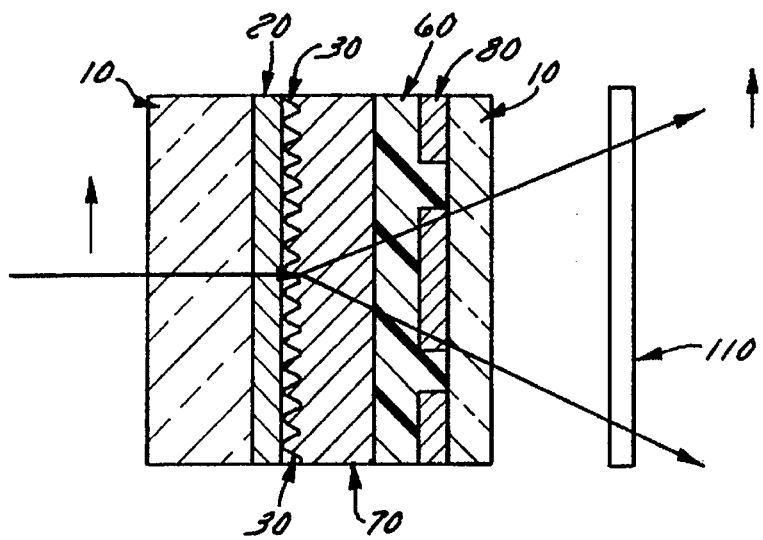
FIG. 2B illustrates a schematic view of a the switchable liquid crystal cell shown in FIG. 2A, in an "ON" state.

Referring now to FIG. 2B, a pixelated liquid crystal cell in an "ON" state is depicted. When the voltage is at maximum, diffusion can also be maximum (e.g., 100%). Further, the liquid crystal 70 can have a refractive index that varies as a function of an applied voltage differential. As noted above, the refractive index of the light shaping holographic surface relief diffuser 30 can be approximately 1.50. This is less than the refractive index of the liquid crystal at maximum voltage which can be approximately 1.70. Thus, at maximum voltage, the difference in refractive index can be approximately 0.20. This difference in refractive index can be enough to enable the light shaping holographic surface relief diffuser 30 to act upon the incoming light and completely redistribute it into a predetermined output distribution. In contrast to FIG. 2A, light passes through the system as depicted in FIG. 2B and beyond polarizer 110 because liquid crystal 70 does not rotate the light due to the voltage differential that is applied thereto.

Figure 3:
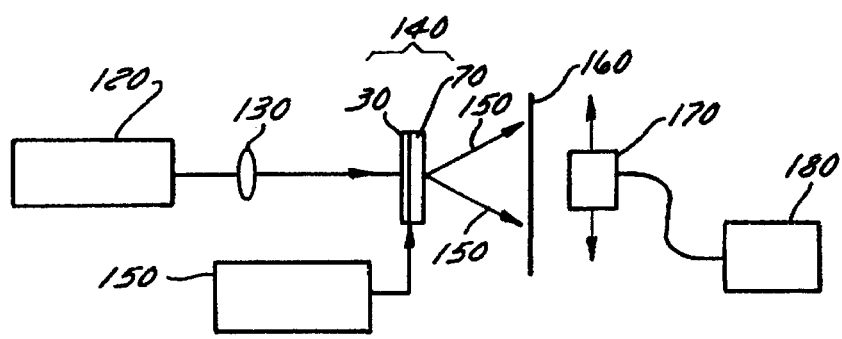
FIG. 3 illustrates a block diagram of an instrument for characterizing the performance of an apparatus according to present invention.

Referring now to FIG. 3, an experimental apparatus for characterizing the presently claimed invention is depicted. Polarized helium-neon laser 120 causes light to be incident upon lens 130. Light from lens 130 passes to experimental module 140. Experimental module 140 includes light shaping holographic surface relief diffuser 30 and liquid crystal 70. When function generator 150 imposes a voltage differential upon liquid crystal 70, the refractive index of liquid crystal 70 can increase with regard to the refractive index of light shaping holographic surface relief diffuser 30 and the beam shaping properties of the light shaping holographic surface relief diffuser 30 cause light rays 150 to be diffused toward observation plane 160. Detector 170 measures power output as a function of spatial location and transmits the results to power meter 180.

Figure 4A:
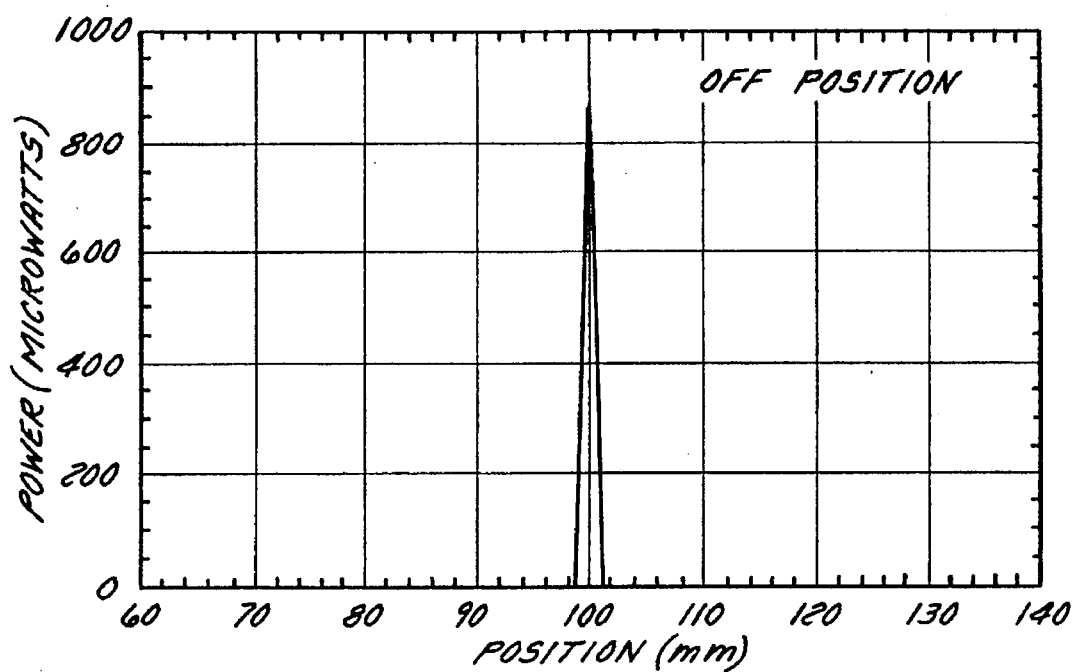
FIG. 4A illustrates a plot of power output as a function of scalar position, from a liquid crystal apparatus according to the present invention, in an "OFF" state.

Referring now to FIG. 4A, unexpectedly good results obtained from the apparatus depicted in FIG. 3 are shown when the experimental module 140 is in an "OFF" condition (i.e., no voltage differential is imposed). The driving voltage can be from approximately 0 to approximately 10 volts, square wave at approximately 1 KHz. The intensity of measured light across the observation plane 160 in FIG. 4A, (no polarizer is present), during the off state corresponds to 0 voltage. It can be appreciated by those skilled in the art that the output is a narrow peak. This proves that the refractive index matching negates the effect of light shaping holographic surface relief diffuser 30.

Figure 4B:
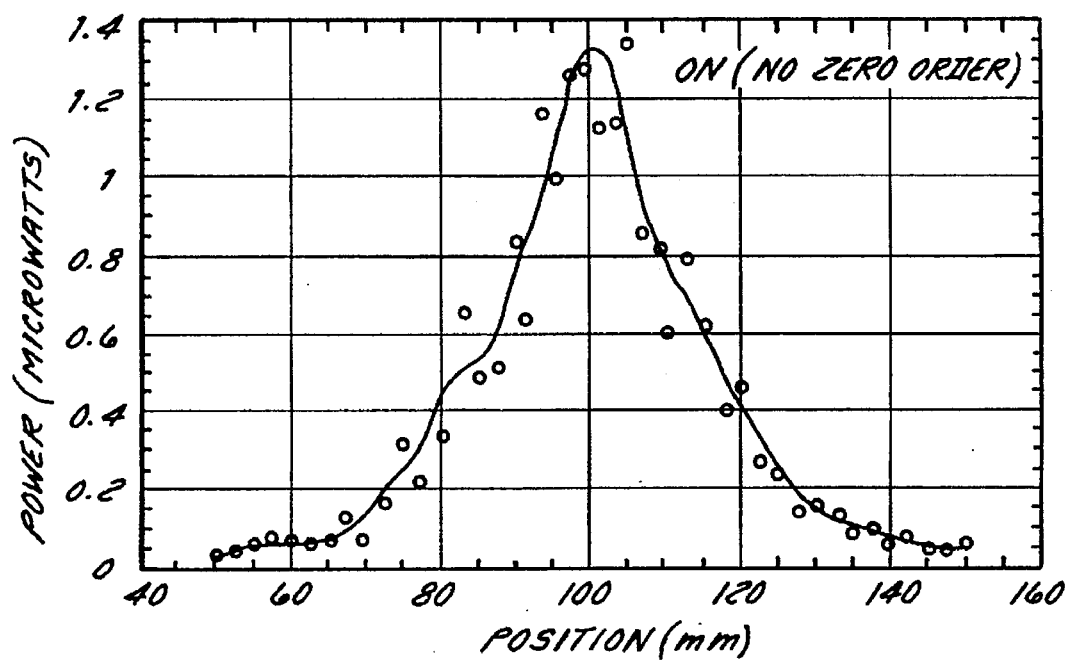
FIG. 4B illustrates a plot of power output as a function of scalar position, from the apparatus used to generate the plot of FIG. 4A, in an "ON" state.

Referring now to FIG. 4B, unexpectedly good results obtained from the apparatus depicted in FIG. 3 are shown when the experimental module 140 is in an "ON" state. Measured light intensity in this "ON" state is depicted for the same sample that is represented in the "OFF" state in FIG. 4A.

The results depicted in FIGS. 4A and 4B demonstrate substantially improved results that were unexpected. Specifically, the measured diffused power output is unexpectedly advantageously broader. Further, the amount of harshness in the measured diffuser power output as a function of scalar position is unexpectedly advantageously low.

While not being limited to any particular identifier, preferred embodiments of the present invention can be identified one at a time by testing for the presence of a smooth wide central peak and low amplitude at high scalar displacement from the center. The test for he presence of a smooth wide central peak and low amplitude at high scalar displacement from the center can be carried out without undue experimentation by the use of the simple and conventional output characterization experiment illustrated in FIG. 3.

Methods for making the light shaping holographic surface relief diffusers of the present invention are now described. Generally, the first step is to create a master diffuser, the second step is to record in a photosensitive medium with coherent light passed through the master diffuser, and the third step is to replicate the surface structure of the photosensitive medium with, for example, epoxy. A fourth and optional step is to make a metal electroform master from the epoxy for mass production purposes. In the alternative, an electroform master may be made directly from the master diffuser.

Figure 5:
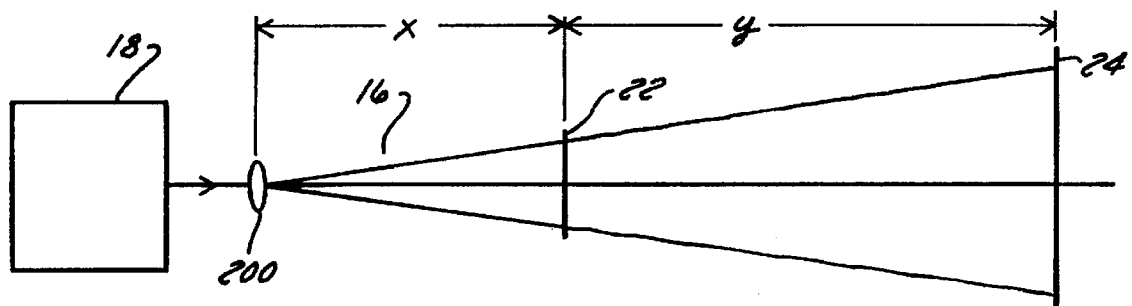
FIG. 5 illustrates a recording set-up for making the light shaping holographic surface relief diffusers according to the present invention.

Referring to FIG. 5, a recording set-up 16 is shown comprising a coherent laser light source 18, objective lens 200, master diffuser 22, and photosensitive medium 24. Coherent laser light source 18 is standard. The objective lens 200 is standard and may be a low or high magnification lens depending upon the desired characteristics of the photosensitive medium 24. The objective lens is spaced a distance X from the master diffuser 22. The master diffuser 22 may comprise a standard ground glass diffuser, a lenticular diffuser, an acetate diffuser, or a holographic diffuser. The ground glass, lenticular, and acetate diffusers are conventional and made in a conventional manner. If a holographic master diffuser is desired to be used, that master diffuser may itself first be recorded in the recording set-up shown in FIG. 5 with the holographic master diffuser to be recorded being positioned at 24 and a conventional ground glass diffuser being located at 22. That master diffuser may then be used to record into another photosensitive medium to be used as a light shaping holographic surface relief diffuser according to the present invention.

A related set-up for recording volume holographic diffusers is described in U.S. Pat. No. 5,365,354. According to that disclosure, recording a holographic plate with coherent laser light passed through a conventional ground glass diffuser generates features called speckle in the volume of the hologram. The size, shape, and orientation of the speckle can be adjusted which in turn affects the angular spread of light scattered from the holographic diffuser upon playback. Generally, the size of the angular spread of the scattered light, in other words, the angular distribution of the scattered light, depends on the average size and shape of the speckle. If the speckle are small, angular distribution will be broad. If the speckle size is horizontally elliptical, the shape of the angular distribution will be vertically elliptical. Thus, it is desirable to control the size and shape of speckle recorded in the medium so that, upon playback, the correct output or angular spread is produced.

Speckle size is inversely proportional to the size of the aperture of the master diffuser. If the size of the aperture increases, the size of the speckle decreases and the size of the angular spread of the scattered light from the recorded photosensitive medium increases. Conversely, if the size of the master diffuser aperture decreases, the size of the speckle recorded in the diffuser increases and the angular spread of light scattered from the recorded photosensitive medium decreases. Thus, if the master diffuser aperture is long and narrow, the speckle will be long and narrow as well with their axes oriented perpendicularly to the axis of the aperture. This holds true for both volume holographic recording media as well as surface holographic recording media.

Diffusers made from volume holographic recording media as in U.S. Pat. No. 5,365,354, however, are disclosed there for their volume effect. In other words, the speckle recorded in the interior or volume of the medium was thought the only desired effect to be obtained from the material. However, since then we have discovered that recording a volume holographic angular spread such as DCG (dichromated gelatin) in a similar recording set-up produces a surface effect of peaks and valleys which may be replicated as described below.

The size, shape, and orientation of the surface features recorded in photosensitive medium 24 is a function of a number of variables including the type of objective lens 200 and master diffuser 22 used, as well as the relative positioning of those components with respect to each other and with respect to the photosensitive medium 24. Ultimately, the desired results are obtained through empirical testing. In order to achieve a recorded photosensitive medium having a particular surface structure that can be replicated and comprise a light shaping holographic surface relief diffuser according to the present invention, it may be necessary to adjust the parameters discussed below to achieve the desired shape of the light output.

The objective lens 200 expands the coherent laser light source 18 so that the area of incidence (or "apparent aperture") of light from the objective lens 200 on the master diffuser 22 is larger than that of the cross section of the laser beam itself. The light beam expands in accordance with the magnification of the objective lens 200.

Consequently, if a small magnification objective lens is used, such as 5×, the aperture of light incident the master diffuser 22 will be smaller than with a large magnification objective lens, such as 60× or greater, and therefore the size of the surface features recorded in the photosensitive medium 24 will be larger; the size of the aperture of light incident the master diffuser 22 is inversely related to the size of the surface features recorded in the photosensitive medium 24.

The distance between the objective lens 200 and the master diffuser 22 must also be taken into account in achieving the desired sculpted surface structure recorded in the photosensitive medium 24. As the distance between the objective lens 200 and the master diffuser 22 decreases, i.e., as X decreases, the size of the speckle increases. This occurs because as the objective lens 200 moves closer to the master diffuser 22, the apparent aperture of light incident the master diffuser 22 is smaller. Because the size of the speckle recorded in the photosensitive medium 24 is inversely related to the size of the apparent aperture on the master diffuser 22, the speckle will be larger. In turn, the increased speckle size recorded in the photosensitive medium 24 will result in a light shaping holographic surface relief diffuser which has decreased diffusion.

Conversely, if the distance X is increased, the apparent aperture of light incident the master diffuser 22 will increase, thus decreasing the size of the speckle recorded in the photosensitive medium 24 and in turn increasing the amount of angular spread of the light shaping holographic surface relief diffuser.

The distance Y between the master diffuser 22 and the photosensitive medium 24 also affects speckle size. As the distance Y decreases, the size of the speckle recorded in the photosensitive medium 24 decreases as well. This occurs because, assuming an expanded beam of light is produced at objective lens 200, as the photosensitive medium 24 is moved closer to the master diffuser 22, the light beam emanating from each of the irregularities in the master diffuser 22 will expand less by the time it reaches the photosensitive medium 24, thus producing smaller speckle. Conversely, if the distance Y is increased, the size of the speckle recorded will be increased. Thus, these simple relationships between the distances X, Y, and the magnification of the objective lens 200, are all adjusted, empirically, to achieve the size of speckle desired in the photosensitive medium 24.

Predefined output areas that are "off-axis" with respect to the normal axis of the diffuser are achieved by tilting the photosensitive medium 24 around an axis normal to its surface. For example, a 20° off axis diffuser may be achieved by fitting the photosensitive medium 24 roughly 20°.

Assuming that a ground glass diffuser is used as the master diffuser 22, the shape of the speckle recorded in photosensitive medium 24 will be roughly round as will the shape of the angular output of a light shaping holographic surface relief diffuser made from photosensitive medium 24. A round output may also be achieved when a lenticular or an acetate sheet is used as a master diffuser 22. Lenticular sheets have tiny lens-like elements machined in them. Acetate diffusers are made by an extrusion and embossing process which also yields roughly round speckle. It is difficult to create or control the desired irregularities in acetate diffusers. With respect to lenticular diffusers, the surface effects necessary to achieve varying output shapes are complex machined macroscopic structures. If a prerecorded holographic master diffuser is used as the master diffuser 22, additional degrees of recording freedom are achieved because the master diffuser can be prerecorded with speckle having virtually any shape, size, and orientation as discussed further below. Speckle characteristics are more easily controlled using a holographic master diffuser.

In any case, in the recording set-up in FIG. 5, the master diffuser must be able to transmit light so that it reaches the photosensitive medium 24 from the objective lens 200. Thus, if a substrate is needed as part of the master diffuser 22, such as if a holographic master diffuser is used, the substrate should be capable of efficiently transmitting light. A glass substrate is preferable. In addition to the additional degrees of freedom which can be achieved by using a prerecorded volume or surface hologram as the master diffuser 22, holographic master diffusers are preferable because better uniformity of intensity in the photosensitive medium 24 is achieved, higher transmission efficiency through the master diffuser 22 is achieved, and the holographic master diffuser 22 causes less back scatter than a ground glass diffuser. A first generation holographic volume master diffuser may be made using a ground glass or acetate diffuser. This holographic diffuser can then be used to make a second generation holographic master diffuser, either volume or surface with greater control.

While not being bound by theory, the following observation can be made regarding the present invention. The field of view, including the horizontal and vertical extent, can be determined, in advance by the manufacturer. The brightness of the display can be enhanced because light can be preferentially sent to a known volume in space where a viewer's eye will tend to be located. Because the holographic surface relief diffuser has a microstructure typically smaller than a pixel in a liquid crystal display, resolution and contrast is very high. Diffusion characteristics may be controlled by varying the voltage to the liquid crystal cell thereby enabling a user-determined amount of light to pass straight through in zero order without diffusion.

All the disclosed embodiments are useful in conjunction with a directional viewing screen such as are used for the purpose of a white light illuminated liquid crystal display, or for the purpose of a laser illuminated projection display (e.g., red-green-blue (RGB)), a laser scanned projection display (RGB), or for the purpose of volumetric three dimensional (3 D) displays using stacks of switchable LC/LSD, or the like. There are virtually innumerable uses for the present invention, all of which need not be detailed here. All the disclosed embodiments can be practiced without undue experimentation.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

For example, the diffusion characteristics could be enhanced by providing more sophisticated light shaping holographic surface relief diffusers. Similarly, although liquid crystal is preferred, any suitable electro-optic material could be used in its place. In addition, the individual components need not be fabricated from the disclosed materials, but could be fabricated from virtually any suitable materials.

Moreover, the individual components need not be formed in the disclosed shapes, or assembled in the disclosed configuration, but could be provided in virtually any shape, and assembled in virtually any configuration, which are switchable so as to provide diffusion. Further, although the liquid crystal cell, and the display, are described herein as physically separate modules, it will be manifest that the cells or the display, may be integrated into the apparatus with which it is associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

What is claimed is:

1. A holographic high contrast viewing screen embedded in a liquid crystal display comprising:
   a first substrate;
   a first electrode connected to said first substrate;
   a light shaping holographic surface relief diffuser connected to said first electrode, said light shaping holographic surface relief diffuser having a first orientation and a first refractive index;
   a liquid crystal adjacent said light shaping holographic surface relief diffuser, said liquid crystal having a second refractive index that is substantially equal to said first refractive index, in absence of a driving voltage;
   an alignment layer adjacent said liquid crystal, said alignment layer having a second orientation that is substantially orthogonal to said first orientation;
   a second electrode connected to said alignment layer; and
   a second substrate connected to said second electrode,
   wherein said second refractive index varies as a function of the driving voltage, said driving voltage being applied between said first electrode and said second electrode.

2. The holographic high contrast viewing screen of claim 1, wherein said light shaping holographic surface relief diffuser defines a first plane and said alignment layer defines a second plane that is substantially parallel to said first plane.

3. The holographic high contrast viewing screen of claim 1, wherein said light shaping holographic surface relief diffuser includes acrylic.

4. The holographic high contrast viewing screen of claim 1, wherein said alignment layer includes polyvinylalcohol.

5. The holographic high contrast viewing screen of claim 1, wherein both said first electrode and said second electrode include indium-tin-oxide.

6. The holographic high contrast viewing screen of claim 1, wherein said liquid crystal includes at least one material selected from the group consisting of PPMEOB and PPPOB.

7. A method of making the holographic high contrast viewing screen of claim 1, comprising:
   coating said first electrode onto said substrate;
   attaching said light shaping holographic surface relief diffuser to said first electrode;
   attaching said alignment layer to said second electrode; and
   encasing said liquid crystal between said light shaping holographic surface relief diffuser and said alignment layer.

8. A method for diffusing incident light comprising utilizing the holographic high contrast viewing screen of claim 1.

9. A liquid crystal cell comprising:
   a substrate;
   a first electrode connected to said first substrate;
   a light shaping holographic surface relief diffuser connected to said first electrode, said light shaping holographic surface relief diffuser having a first orientation and a first refractive index;
   a liquid crystal adjacent said light shaping holographic surface relief diffuser, said liquid crystal having a second refractive index that is substantially equal to said first refractive index, in absence of a driving voltage;
   an alignment layer adjacent said liquid crystal, said alignment layer having a second orientation that is substantially orthogonal to said first orientation; and
   a second electrode connected to said alignment layer,
   wherein said second refractive index varies as a function of the driving voltage, said driving voltage being applied between said first electrode and said second electrode.

10. The liquid crystal cell of claim 9, wherein said light shaping holographic surface relief diffuser defines a first plane and said alignment layer defines a second plane that is substantially parallel to said first plane.

11. The liquid crystal cell of claim 9, wherein said alignment layer includes polyvinylalcohol.

12. The liquid crystal cell of claim 9, wherein both said first electrode and said second electrode include indium-tin-oxide.

13. The liquid crystal cell of claim 9, wherein said liquid crystal includes at least one material selected from the group consisting of PPMEOB and PPPOB.

14. A method of making the liquid crystal cell of claim 9, comprising:
   coating said first electrode onto said substrate;
   attaching said light shaping holographic surface relief diffuser to said first electrode;
   attaching said alignment layer to said second electrode; and
   encasing said liquid crystal between said light shaping holographic surface relief diffuser and said alignment layer.

15. A method for diffusing incident light comprises utilizing the liquid crystal cells of claim 9.

16. A method comprising:
   providing a holographic high contrast viewing screen embedded in a liquid crystal display with
     a first substrate;
     a first electrode connected to said first substrate;
     a light shaping holographic surface relief diffuser connected to said first electrode, said light shaping holographic surface relief diffuser having a first orientation and a first refractive index;
     a liquid crystal adjacent said light shaping holographic surface relief diffuser, said liquid crystal having a second refractive index that is substantially equal to said first refractive index, in absence of a driving voltage;
     an alignment layer adjacent said liquid crystal, said alignment layer having a second orientation that is substantially orthogonal to said first orientation;
     a second electrode connected to said alignment layer; and
     a second substrate connected to said second electrode; and
   applying the driving voltage between said first electrode and said second electrode,
     wherein said second refractive index varies as a function of the driving voltage.

17. The method of claim 16, wherein said voltage differential varies periodically as a function of time.

18. A product made by the method of claim 16.

* * * * *